(12) United States Patent
Leggett

(10) Patent No.: US 8,451,603 B2
(45) Date of Patent: May 28, 2013

(54) ATTACHMENT MECHANISM

(75) Inventor: William F. Leggett, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 204 days.

(21) Appl. No.: 12/900,120

(22) Filed: Oct. 7, 2010

(65) Prior Publication Data

US 2012/0087066 A1    Apr. 12, 2012

(51) Int. Cl.
*G06F 1/16*    (2006.01)

(52) U.S. Cl.
USPC ............ 361/679.58; 361/679.01; 361/679.03; 361/732; 312/223.1; 312/223.2

(58) Field of Classification Search
USPC .................................................. 361/679.58
See application file for complete search history.

(56) References Cited

U.S. PATENT DOCUMENTS

| | | | |
|---|---|---|---|
| 5,233,506 A * | 8/1993 | Semenik et al. | 361/814 |
| 5,808,863 A * | 9/1998 | Radloff et al. | 361/679.58 |
| 5,886,869 A * | 3/1999 | Fussell et al. | 361/679.31 |
| 6,876,543 B2 * | 4/2005 | Mockridge et al. | 455/347 |
| 2003/0043310 A1 | 3/2003 | Cho | |
| 2008/0094789 A1 | 4/2008 | Lee | |
| 2008/0239647 A1 * | 10/2008 | Luo et al. | 361/683 |
| 2009/0219675 A1 | 9/2009 | Huang et al. | |
| 2012/0075800 A1 * | 3/2012 | Anguiano-Wehde et al. | 361/679.58 |

FOREIGN PATENT DOCUMENTS

EP    1 150 199 A2    10/2001

OTHER PUBLICATIONS

International Search Report dated Feb. 1, 2012 in PCT Application No. PCT/US2011/053073 (APL1P768WO).
Written Opinion dated Feb. 1, 2012 in PCT Application No. PCT/US2011/053073 (APL1P768WO).
Taiwanese Office Action for 100218435 dated May 22, 2012.

\* cited by examiner

*Primary Examiner* — Anthony Q Edwards
(74) *Attorney, Agent, or Firm* — Womble Carlyle Sandridge & Rice LLP

(57) ABSTRACT

An attachment mechanism for attaching a first component and a second component includes at least a body integrally formed with the first component. In the described embodiment, the body includes at least a first portion, and a second portion spaced apart from the first portion where the first portion is deflectable in at least a first direction and the second portion is deflectable in at least a second direction substantially orthogonal to the first direction. The second portion secures the second component to the first component with a securing force proportional to an amount of deflection of the first portion and the first portion and the second portion remain apart.

21 Claims, 13 Drawing Sheets

ATTACHMENT MECHANISM

FIELD OF THE DESCRIBED EMBODIMENTS

The described embodiments relate generally to portable electronic devices. In particular, enhancing the structural integrity of a multipart housing used for the portable electronic device is discussed.

DESCRIPTION OF THE RELATED ART

A portable electronic device can be assembled using various components. For example, the portable electronic device can include at least two part housing. The two part housing can be formed of a first part arranged to receive a plurality of operational components and a second part that can be attached to the first part using any suitable attachment mechanism. In this way, the two part housing can be used to enclose and support the components of the portable electronic device.

Therefore, an attachment mechanism suitable for a securing a multipart housing is desired.

SUMMARY OF THE DESCRIBED EMBODIMENTS

This paper describes various embodiments that relate to systems, methods, and apparatus for forming multipart enclosures for use in portable electronic devices.

An attachment mechanism for attaching a first housing component and a second housing component is described. The attachment mechanism includes at least a body integrally formed with the first housing component. In the described embodiment, the body includes at least a first flexure portion independent of a second flexure portion each of which are spaced apart from each other. The first flexure portion responds to an externally applied force by biasing the second housing component with a securing force that secures the first and second housing components together. The securing force is proportional to an amount of deflection of the first flexure portion.

A method of attaching a first housing component and a second housing component together using an attachment feature is described. The attachment feature is integrally formed with the first housing component. The attachment feature attaches the first and second housing components together by a first flexure portion of the attachment feature applying a biasing force to the second housing component. A second flexure portion of the attachment feature has an engagement feature that is captured by a locking feature integrally formed on the second housing component with a securing force that is proportional to the biasing force.

A portable electronic device includes at least a plurality of operational components and a multipart housing arranged to enclose and secure at least some of the plurality of operational components. In the described embodiment, the multipart housing includes at least a first and second housing component where the first housing component has a first attachment feature integrally formed therewith. The first attachment feature having a first flexure portion arranged to provide a biasing force when activated by contact with the second housing component and a second flexure portion having an engagement feature. The multipart housing also includes a second housing component having a locking feature with a size and shape in accordance the engagement feature. In this way, the first attachment feature securely attaches the first and second housing components together by the locking feature capturing the engagement feature with a locking force having a magnitude about that of the biasing force.

A method of assembling a portable electronic device having a multipart housing can be carried out by providing a first and second housing component of the multipart housing, the first housing component having an attachment feature integrally formed on an edge portion of the first housing component, the attachment feature comprising a first flexure portion and a second flexure portion, the second flexure portion having an engagement feature, providing a plurality of operational components, securing at least some of the plurality of operational components into the second housing component, aligning the attachment feature with a locking feature integrally formed on a first surface of the second housing component such that the locking feature aligns with the engagement feature, placing the first housing component in contact with the second housing component by placing the first flexure portion in contact with an inside surface of a second surface of the second housing component concurrently with the second flexure portion in sliding contact with an inside surface of the first surface of the second housing component, and moving the first housing component in relation to the second housing component until the locking feature captures the engagement feature with a locking force.

Other aspects and advantages of the invention will become apparent from the following detailed description taken in conjunction with the accompanying drawings which illustrate, by way of example, the principles of the invention.

BRIEF DESCRIPTION OF THE DRAWINGS

The invention will be readily understood by the following detailed description in conjunction with the accompanying drawings, wherein like reference numerals designate like structural elements, and in which.

DETAILED DESCRIPTION OF SELECTED EMBODIMENTS

Figure 1:
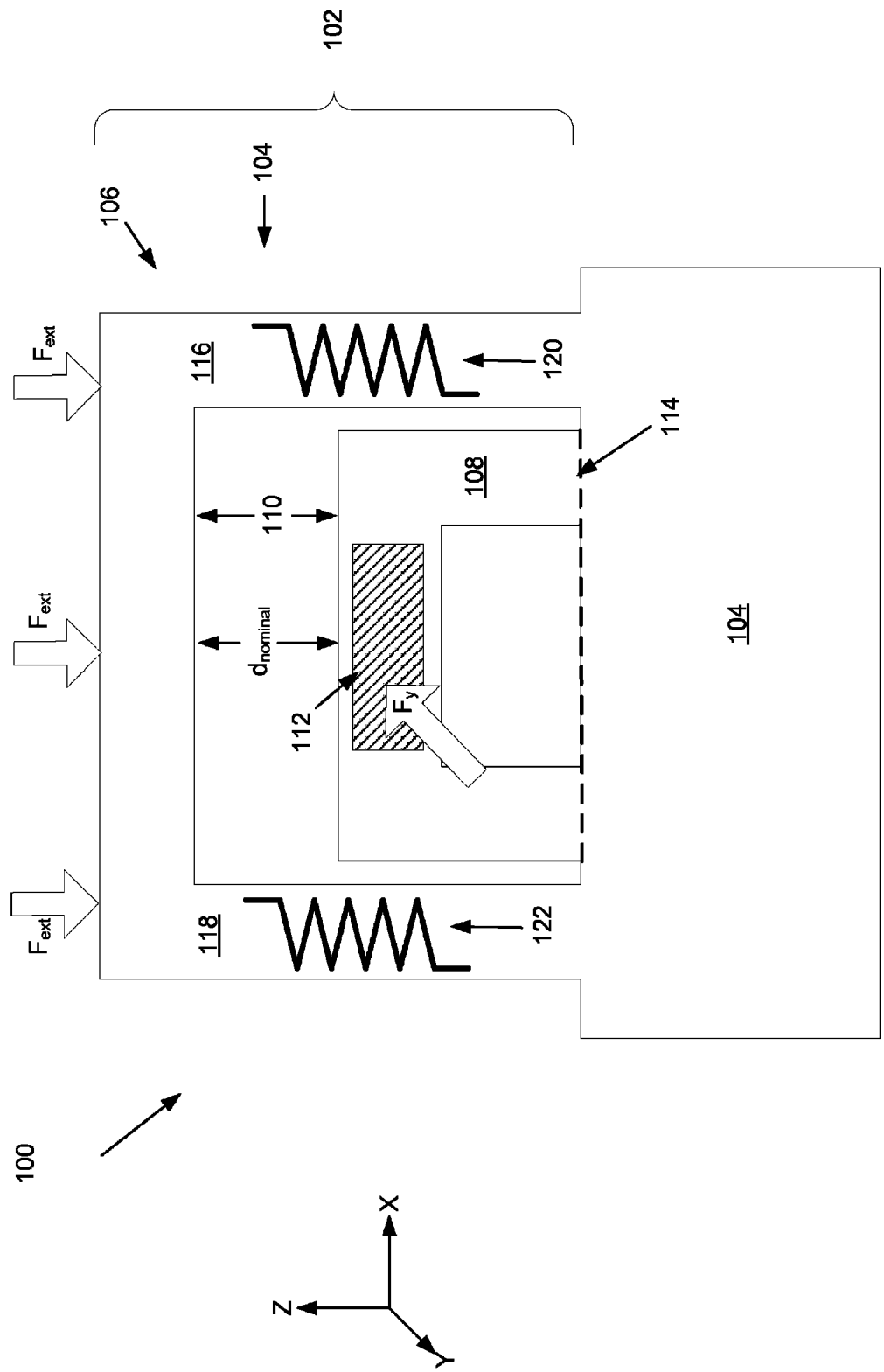
FIG. 1 shows a representative beam type attachment feature in an inactive state in accordance with the described embodiments.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments as defined by the appended claims.

The following discussion relates to a mechanism that can be used to securely attach together at least a first component and a second component. The mechanism can take the form of an attachment feature integrally formed with the first component. The attachment feature having a first portion that can operate substantially independent of a second portion. The second portion can engage a locking feature integrally formed on the second component. A biasing force generated by the first portion independent of the second portion can be used to secure the second portion to the locking feature. In one embodiment, the first portion can be formed of a reversibly deformable material that can resist an applied load by generating the biasing force, the biasing force being used to secure the second portion to the locking feature and, as a result, the first and second components are secured together.

In a particular embodiment, the attachment feature can include at least a body integrally formed with the first component. The body can be arranged such that the first portion and the second portion remain spaced apart from each other. The first portion can be formed of a material such as metal that can render the first portion reversibly deflectable when a load is applied. It should be noted that the deflection of the first portion does not exceed a maximum amount of deflection such that the first and second portions can remain apart and separate from each other. In this way, the dynamic interaction between the first and second portions is mediated only by way of the biasing force transmitted by way of the second component to the second portion. The biasing force being proportional to the amount of deflection of the first portion. In the described embodiments, the first portion can deflect in at least a first direction whereas the second portion can deflect in at least a second direction that is substantially orthogonal to the first direction. The biasing force can be used to secure the second portion to the locking feature.

In the following discussion and without loss of generality, the attachment feature can include a first and a second decoupled flexure portions that can be used to mechanically couple at least a first and a second housing component. The attachment feature can be formed as an integral part of the first housing component. The first flexure portion can be formed of a deformable material such as metal that can reversibly deform in response to a force applied on the second housing component placed in contact thereof. The first flexure portion can respond to the applied force by reversibly deforming from a neutral state to a deflected state. In the deflected state, inherent material properties of the first flexure portion can cause the first flexure portion to generate a deflection force that can be proportional to an amount of the deflection of the first flexure portion. The deflection force can, in turn, be transferred by way of the second housing component to the locking feature integrally formed on the second housing component. In this way, the locking feature can bias the second flexure portion with a force having a magnitude of about that of the deflection force.

The locking feature can have a size and shape in accordance with the second flexure portion but can, nonetheless, be widely varied in shape and size. For example, the locking feature can take the form of a slot arrangement formed into a side wall of the second housing component. In this way, the housing components can be moved relative to each other such a way that a first surface of the second housing component can engage the first flexure portion. In one case, the second housing component can be fitted over an edge portion of the first housing component. In this configuration, the attachment feature can be positioned at an edge portion of the first housing component. In this way, the second flexure portion of the attachment feature can be configured to engage an inside surface of the second housing component having the locking feature by, for example, flexing in the second direction substantially orthogonal to the first direction. The first and second flexure portions cooperate with each other to secure the first and second housing components to each other.

For example, a first surface of the second housing component can engage the first flexure portion and move in the Z direction relative to the first housing component. The movement of the first surface of the second housing component can cause the first flexure portion to reversibly deform in the Z direction. In the deflected state, the first flexure portion can generate the deflection force in the −Z direction in reaction to the movement of the second housing component. In the described embodiment, the first and second housing components can be arranged such that the second flexure portion can be in contact with a second surface of the second housing component that is essentially perpendicular to the first surface of the second housing component. The second flexure portion can deflect in the second direction that can be essentially orthogonal to the deflection of the first flexure portion. In other words, using Cartesian co-ordinates $\{X, Y, Z\}$, the second flexure portion can deflect in $\{X\}$ or $\{Y\}$ directions. It should be noted that in some cases, the second flexure portion can actually pivot about a pivot point and will therefore have a least a small deflection in $\{Z\}$ but for all intents and purposes can be ignored for this discussion.

In one embodiment, the second housing component can slide over the first housing component. Once in position, the flexure snap can be biased relative to the locking feature to secure the two housing components together. The locking feature can be widely varied such as a slot having an appropriate size and shape to engage the flexure snap. The attachment feature can be well suited for attaching together components of a multipart housing, the multipart housing used to enclose and support operational components of a portable electronic device, for example, The multipart housing can include at least a top cover and a bottom cover each of having a size and shape in accordance with the other.

These and other embodiments are discussed below with reference to FIGS. 1-10. However, those skilled in the art will readily appreciate that the detailed description given herein with respect to these figures.

FIG. 1 shows representative beam type attachment mechanism 100 in accordance with the described embodiments. Attachment mechanism 100 can be used to securely attach at least two components together. In the context of this discussion, attachment mechanism 100 will be described in terms of an attachment mechanism that can be used to securely join multiple components of a multipart housing. The multipart housing can be used to enclose and support operational components of a portable electronic device. It should be noted, however, that attachment feature 100 can have many other uses than the specific examples described herein and therefore should not be construed as limiting the breadth or scope of the described embodiments.

As shown in FIG. 1, attachment feature 100 is shown in what is referred to as a neutral configuration. Attachment feature 100 can include body 102 integrally formed with first housing component 104. First housing component 104 can be part of a multipart housing used to enclose operational components for a portable electronic device along the lines of a portable mass storage device. In any case, body 102 can be formed of material that can respond to an applied force by reversibly deforming. Materials such as metal along the lines of steel, stainless steel and aluminum can be considered appropriate.

Figure 4:
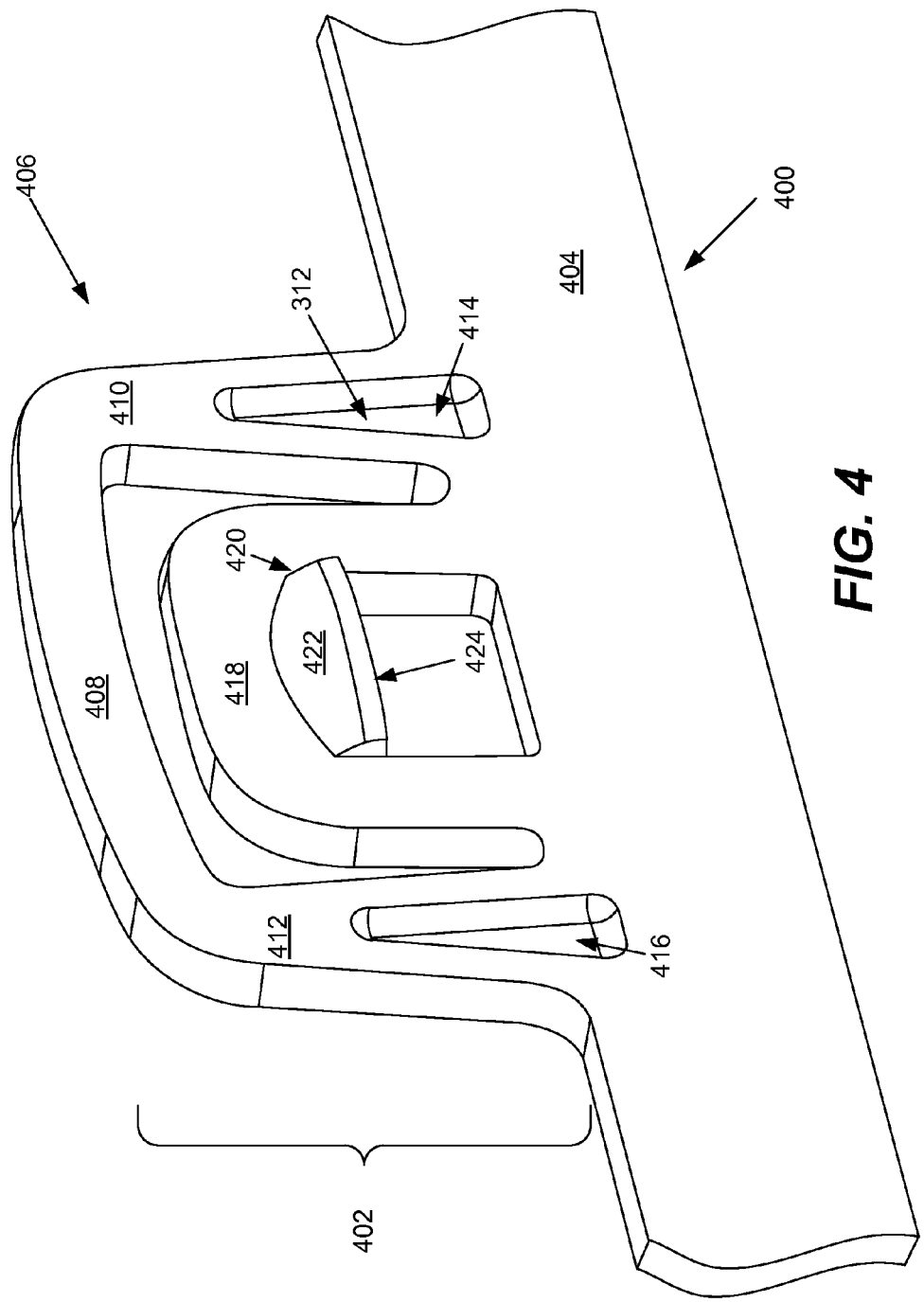
FIG. 4 shows a representation of an arch type attachment feature in an inactive state in accordance with the described embodiments.

Body 102 can include beam type first flexure portion 106 and second flexure portion 108 separated from each other by gap 110. As shown, first flexure portion 106 can take to form of a beam supported by columns where the columns can respond to the application of an external force by undergoing compression. However, in other embodiments (such as shown in FIG. 4), first flexure portion 106 can take the form of an arch supported by columns where the arch undergoes at least limited compression in response to the application of an external force. In these embodiments, the column structures do not under appreciable compression. On the contrary, the column structures are specifically designed to avoid deflection and are used instead as an abutment or stop mechanism that prevents the arch from deflecting beyond maximum amount of deflection.

The embodiment shown in FIG. 1 shows that second flexure portion 108 can include engagement feature 112 (also referred to as flexure snap 112) that can be used to engage a corresponding locking feature on a second housing component. In a neutral, or undeflected state, gap 110 can have a nominal gap size $d_{anominal}$. In response to the application of external force $F_{ext}$, first flexure portion 106 can deflect (i.e., compress) in a first direction. Second flexure portion 108 does not respond directly to the application of external force $F_{ext}$ to first flexure portion 106. Second flexure portion 108 can respond to a force applied directly thereto by deflecting in a manner that is independent of the deflection of first flexure portion 106.

For example, second flexure portion 108 can deflect in a second direction in response to force $F_y$, the second direction being substantially orthogonal to the first direction corresponding to the motion of first flexure portion 106. By substantially orthogonal it is meant that in some embodiments, second flexure portion 108 can pivot about a pivot point or line in which case the second direction will actually include a minor component in the first direction. For example, first flexure portion 106 can deflect in $\{-z\}$ in response to the application in $\{-z\}$ of external force $F_{ext}$. In other words, at least a portion of first flexure portion 106 can compress in response to the application of external force $F_{ext}$. Independent of the movement of first flexure portion 106 in response to the application of external force $F_{ext}$, second flexure portion 108 can move about line 114 in a pivoting motion in response to force $F_y$ applied to second flexure portion 108. The pivoting motion of second flexure portion 108 can include both $\{\pm y\}$ and $\{z\}$ components. However, due to the small motion, the $\{z\}$ component can be ignored for all practical purposes.

Figure 2:
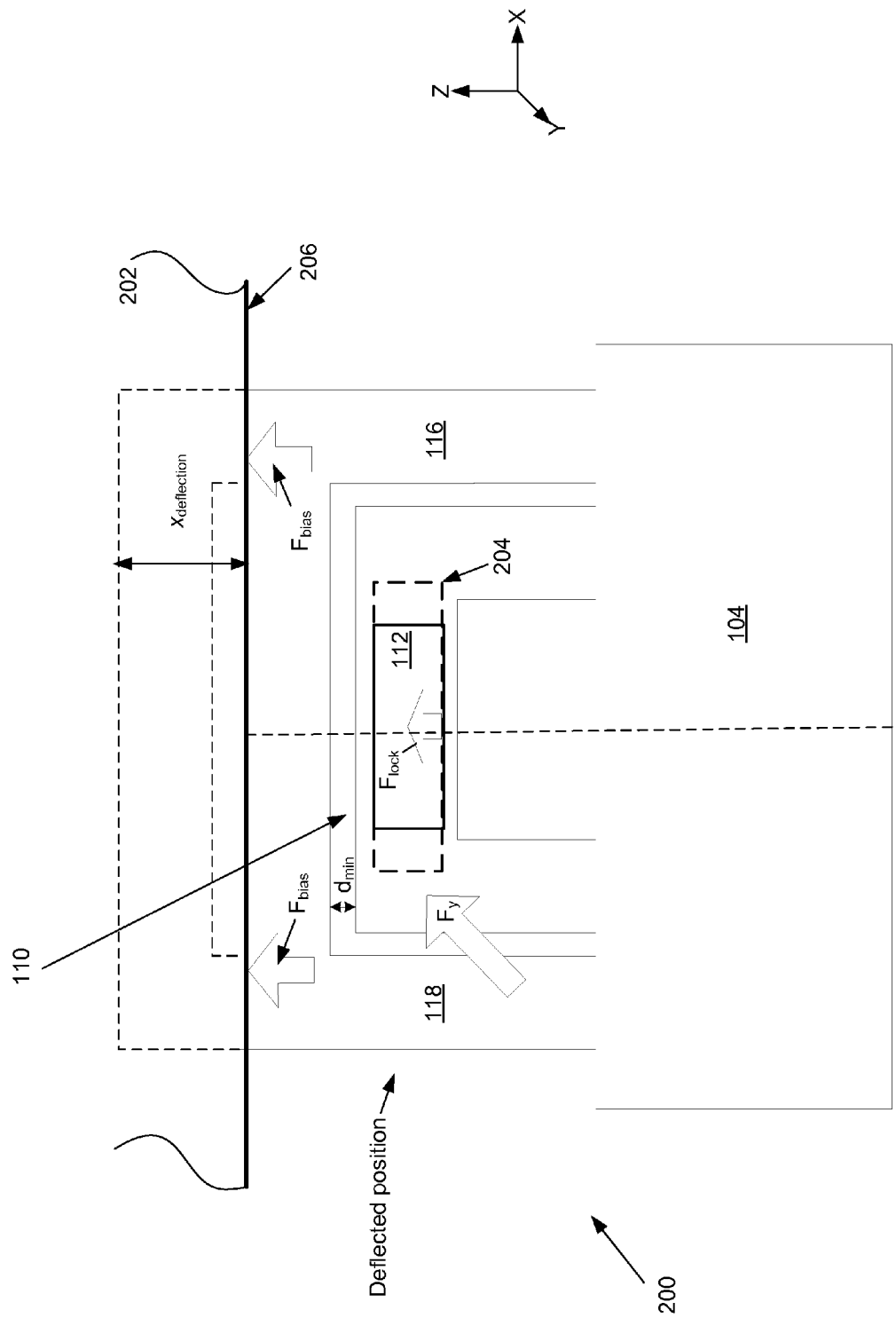
FIG. 2 shows the beam type attachment feature shown in FIG. 1 in an active state.

In order to activate attachment feature 100, external force $F_{ext}$ can be applied to first flexure portion 106. External force $F_{ext}$ can be transferred to columns 116 and 118 each of which can be modeled as springs 120 and 122, respectively. As well known in the art, springs 120 and 122 can respond to the application of external force $F_{ext}$ by compressing distance $x_{deflection}$ as shown in FIG. 2 illustrating system 200 with first flexure portion 106 in a deflected, or activated, state and second flexure portion 108 in an inactive state. In the active state, first flexure portion 106 can generate biasing force $F_{bias}$ according to equation (1):

$$F_{bias} = E \times A_0 \times (\Delta L/L_0) \qquad \text{eq. (1)}$$

Where:
E is Young's modulus (modulus of elasticity);

$A_0$ is original cross-sectional area;
$\Delta L$ is the amount by the length of the column portions change ($d_{deflection}$); and
$L_0$ is original length of the column portions.

Therefore, the choice of the material used to form first flexure portion 106 can be crucial to the proper performance of first flexure portion 106 and attachment feature 100 overall. The material used to form first flexure portion 106 can have mechanical properties that are isotropic (i.e., essentially the same in all directions). With isotropic materials, Young's modulus is essentially constant over a range of strains. Such materials are called linear and are said to obey Hooke's Law. Examples of linear materials can include most metals such as steel and aluminum.

However, anisotropic materials such as metals and ceramics treated with certain impurities and metals mechanically worked to make their grain structures directional can be used. These materials then become anisotropic and Young's modulus will change depending on the direction from which the force is applied. Anisotropy can be found in composites as well. For example, carbon fiber has much higher Young's modulus (is much stiffer) when force is loaded parallel to the fibers (along the grain). For the remainder of this discussion, however, at least first flexure portion 106 will be considered to be formed of isotropic material such as aluminum. In a particular implementation, at least first flexure portion 106 can be formed of aluminum alloy 5052 having a temper designation of H32 (i.e., strain hardened and stabilized with or without thermal treatment and ¼ hard).

Figure 3:
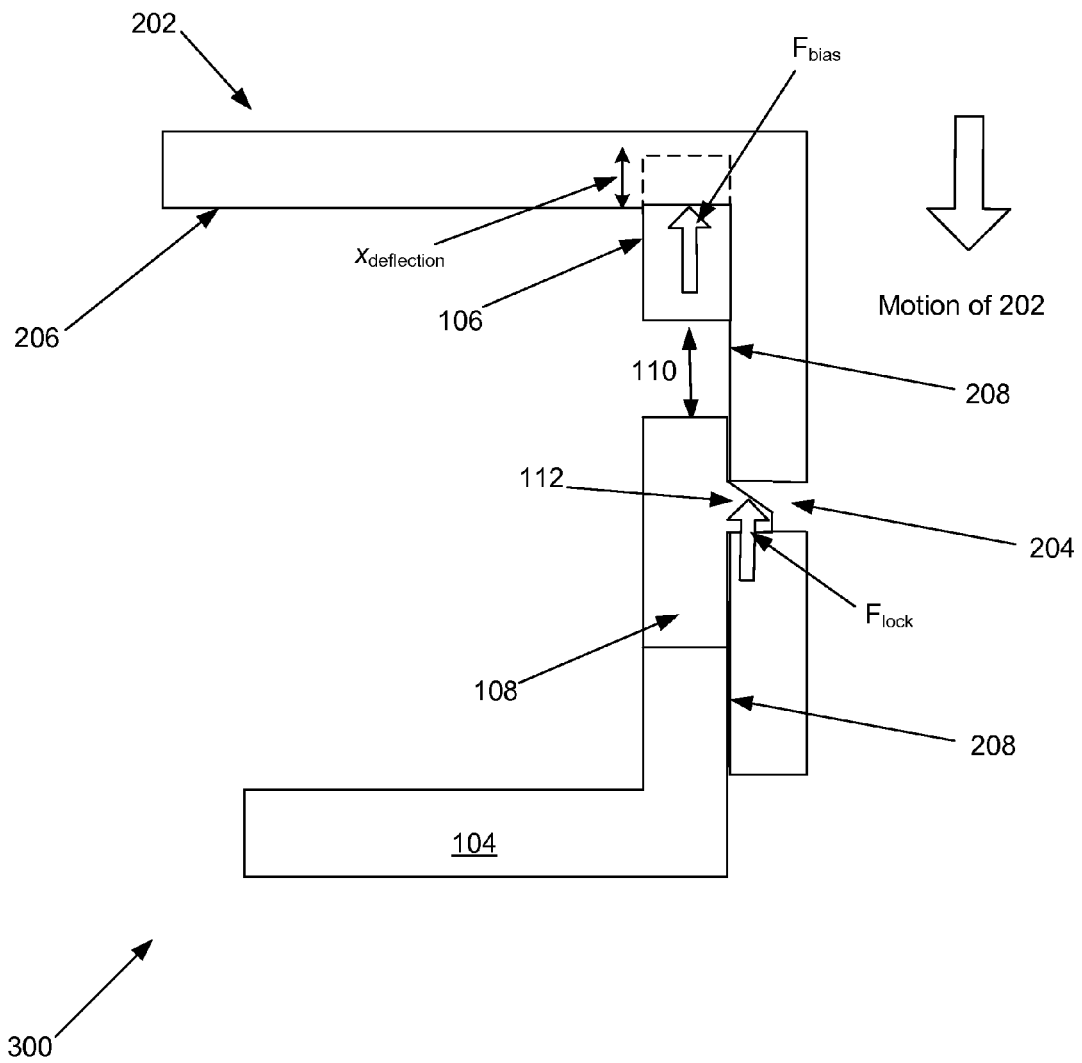
FIG. 3 shows a representative cross section of the beam type attachment feature shown in FIG. 2.

Referring to both FIG. 2 and FIG. 3, where FIG. 3 shows sectional view of system 200 along line AA shown in FIG. 2. When active, first flexure portion 106 can generate biasing force $F_{bias}$ that can be used to bias second housing component 202. Second housing component 202 can include locking feature 204 having a size and shape in accordance with second flexure portion 108 and in particular, flexure snap 112. Locking feature 204 can take the form of a slot having size and shape that can accommodate flexure snap 112 in such a way that biasing force $F_{bias}$ can be transferred by way of second housing component 202 to locking feature 204. In this way, locking feature 204 can engage and secure flexure snap 112 with locking force $F_{lock}$ that is about the same magnitude as biasing force $F_{bias}$.

The force used to secure first housing component 104 and second housing component 202 together can be independent of an amount of force used to activate second flexure portion 108. For example, first flexure portion 106 can be activated by the placement of inner surface 206 of second housing component 202 in contact with first flexure portion 106. Inner surface 206 can then be moved $\{-z\}$ in such a way as to apply external force $F_{ext}$ to first flexure portion 106. First flexure portion 106 can respond to the application of external force $F_{ext}$ (i.e., the movement of surface 206) by deflecting distance $x_{deflection}$ reducing gap size from $d_{nominal}$ to $d_{deflected}$. It should be noted, in order that first flexure portion 106 and second flexure portion 108 to act independently of each other, the gap size must remain greater than $d_{min}$ due in part to the tolerance stack of system 200.

Concurrently with surface 206 moving $\{-z\}$, inside surface 208 of second housing component 202 can also be moving $\{-z\}$ in such a way that can activate second flexure portion 108 with the application of force $F_y$. Force $F_y$ can be generated by, for example, surface 208 sliding along an outside surface of first housing component 104. This sliding force $F_y$ can cause second flexure portion 108 (and flexure snap 112) to move (detent) in $\{-y\}$ a distance consistent with the lateral dimension of flexure snap 112.

While in sliding contact with surface 208, flexure snap 112 can be held in position until flexure snap 112 encounters locking feature 204. In one embodiment, flexure snap 112 can be shaped in such a way that facilitates the sliding action of second surface 208 and at the same time facilitates the engagement of locking feature 204. For example, a surface of flexure snap 112 that comes in sliding contact with surface 208 can have a chamfered, or curved, shape whereas an opposing surface of flexure snap 112 can be shaped to securely engage with locking feature 204. Since second housing component 202 is under bias from first flexure portion 106, flexure snap 112 can engage locking feature 204 with locking force $F_{lock}$ having a magnitude about that of biasing force $F_{bias}$.

FIG. 4 shows representative arch type attachment feature 400 in accordance with another described embodiment. Attachment feature 400 can include body 402 integrally formed with first housing component 404. It should be noted that attachment feature 400 can be located at an edge portion of first housing component 404. In this way, first flexure portion 406 can be activated by the placement of a second housing component (not shown) in contact with arch portion 408. Arch portion 408 can be supported by column structures 410 and 412. In the arch type attachment features, it is arch portion 408 that deflects in response to the application of external force $F_{ext}$ along the lines of a leaf spring. In this way, arch portion 408 can provide biasing force $F_{bias}$ in a well controlled and defined manner. However, in contrast to the beam type attachment features discussed above, column structures 410 and 412 are not designed to appreciably deflect. As a matter of fact, column structures 410 and 412 can be used to prevent arch portion 408 from deflecting beyond a critical threshold amount by acting as abutment structures, or stop mechanisms.

Due to the curvature of arch portion 408 and the placement of column structures 410 and 412, arch portion 408 can be prevented from over-deflecting by transferring any excess load away from arch portion 408 and directly to column structures 410 and 412 when the curvature of arch portion 408 is extremely large in value (i.e., flattens out). By transferring any excess load to column structures 410 and 412, columns 410 and 412 can act as crush preventers by which it meant that if attachment feature 400 undergoes a potentially damaging crush event, any load in excess of that which causes arch portion 408 to deflect to the maximum deflection amount (i.e., flattens out) is transferred by way of column structures 410 and 412 directly to housing 404. Embossments 414 and 416 can be integrally formed with column structures 410 and 412. Embossments 414 and 416 can reduce a moment of inertia of column structures 410 and 412, respectively, thereby reducing the possibility of damage.

Attachment feature 400 can also include second flexure portion 418 having engagement feature 420. Engagement feature 420 can have first curved surface 422 shaped to facilitate the activation of second flexure portion 418. For example, in the case where second flexure portion 418 can be activated by the sliding motion of surface of a housing component, the curved nature of first surface 422 can facilitate the sliding action of the housing component. On the other hand, second surface 424 of engagement feature 420 can have flat shape that is well suited to accommodate a corresponding locking feature. The locking feature can, for example, take the form of a slot having a size and shape in accordance with engagement feature 420.

Figure 5A:
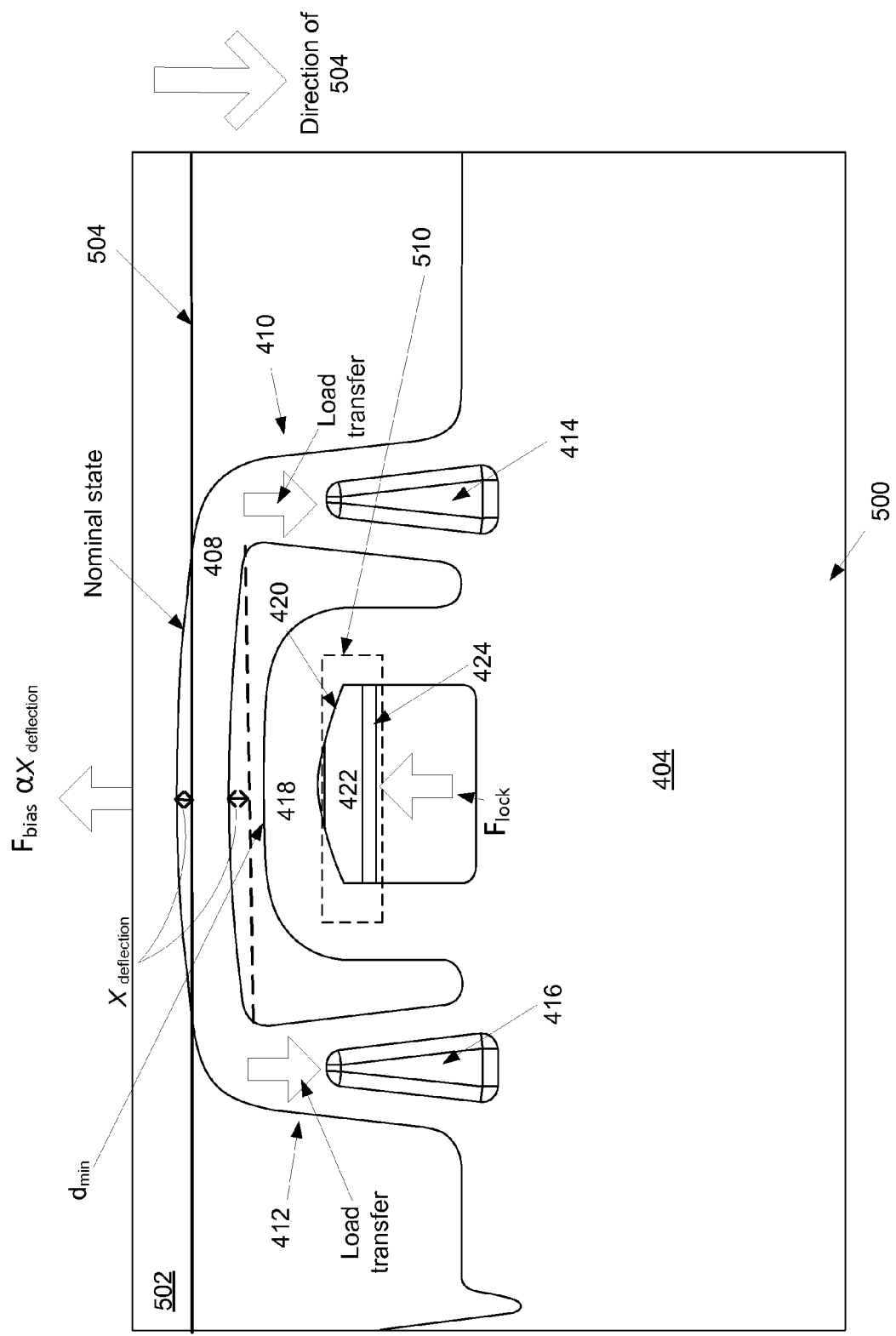
FIGS. 5A and 5B shows a representation of the arch type attachment feature shown in FIG. 4 in an active state.
Figure 5B:
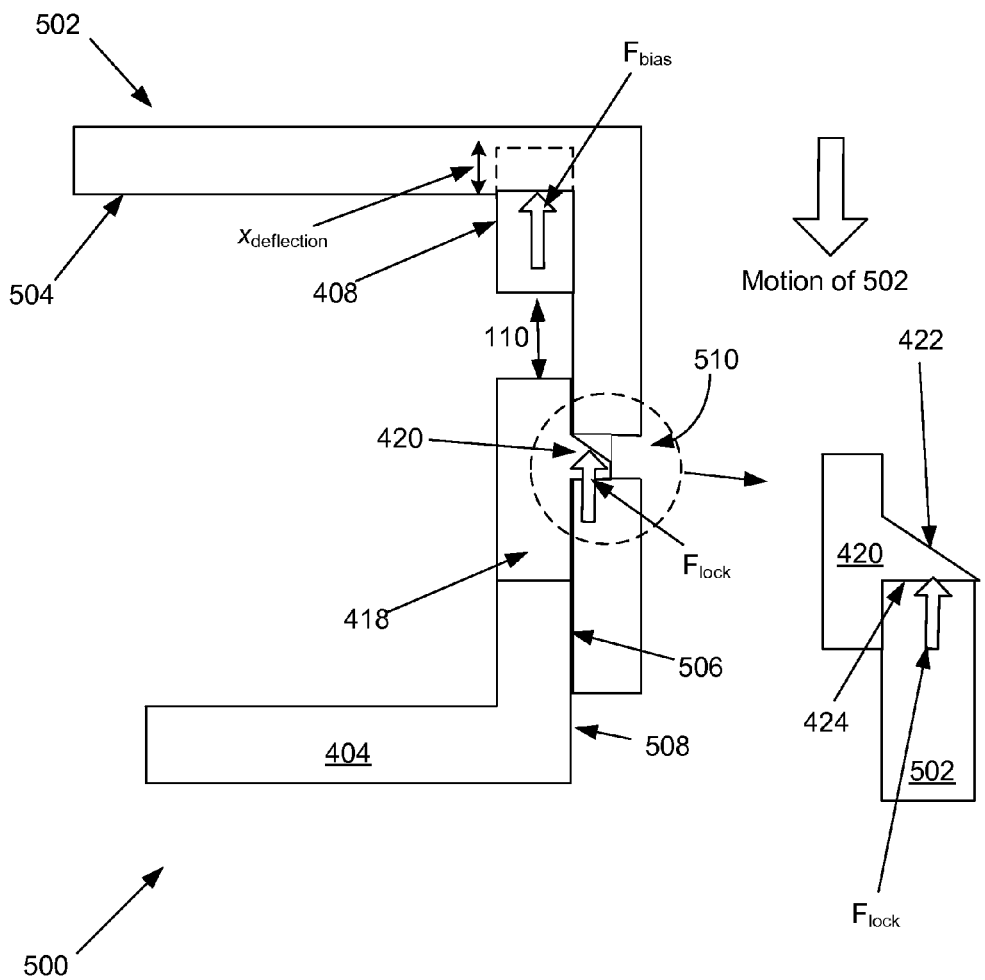

FIGS. 5A and 5B shows system 500 where attachment feature 400 has been activated and used to secure second housing component 502 to first housing component 404. In this embodiment, in order to secure first housing component 404 and second housing component 502, inside surface 504 of second housing component 502 can be placed in contact with arch portion 408. Second housing component 502 can be sized such that inside surface 506 of second housing component 502 can slide over outside surface 508 of first housing component 404. In this way, as surface 504 of second housing component 502 is placed in contact with arch portion 408, inside surface 506 of second housing component 502 can make sliding contact with outside surface 508 of first housing component 404. In this way, inside surface 506 can activate second flexion portion 418 by applying force $F_y$ to surface 422 of engagement feature 420 causing engagement feature 420 move in $\{-y\}$ direction being held in position by inside surface 506 until captured by locking feature 510. Locking feature 510 can have a size and shape such that biasing force $F_{bias}$ can be transferred by second housing component 502 to locking feature 510. In this way, locking feature 510 can secure engagement feature 420 at surface 422 with locking force $F_{lock}$ that is approximately the same magnitude as biasing force $F_{bias}$.

As with the beam type attachment feature, both the material used to form arch portion 408 and the geometry of arch portion 408 can determine the locking force (also referred to as engagement force) used to secure engagement feature 420. In particular the thickness of arch portion 408 and the material used to form arch portion 408 can determine the moment of inertia of arch portion 408. In addition, the amount of interference between arch portion 408 and second housing component 502 can determine $x_{displacement}$ of arch portion 408. Therefore, the tolerance stack up of attachment feature 400 can have a substantial impact on locking force $F_{lock}$. For example, it is important the yield strength and the Young's modulus of the material used to form attachment feature 400 (and in particular engagement feature 420) not be exceeded.

Figure 5C:
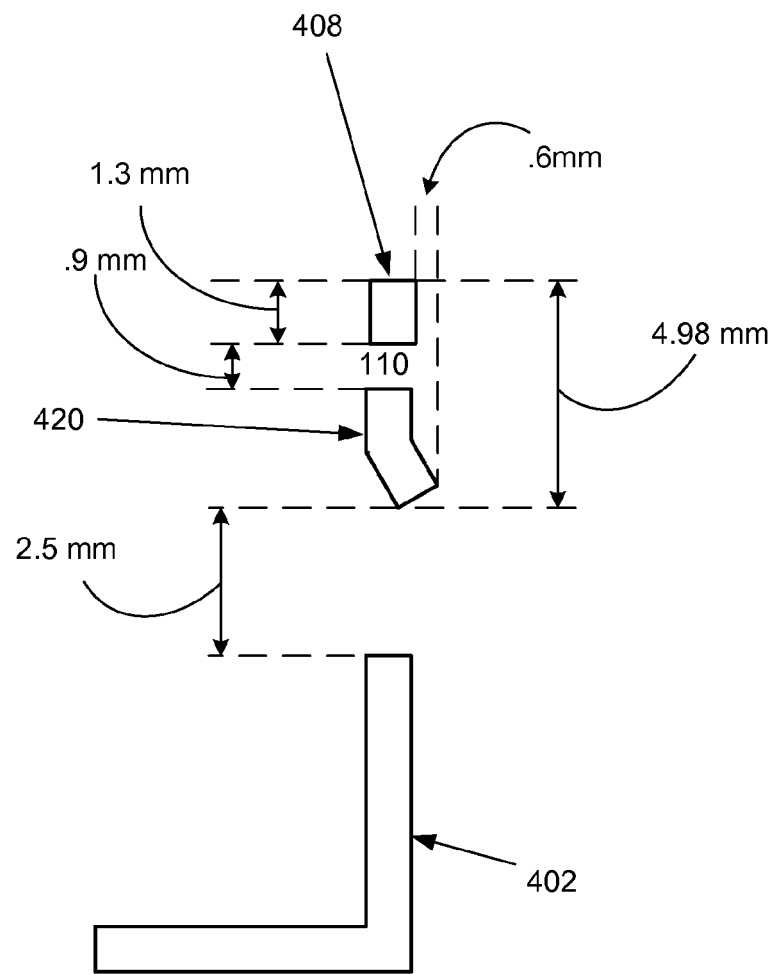
Figure 5D:
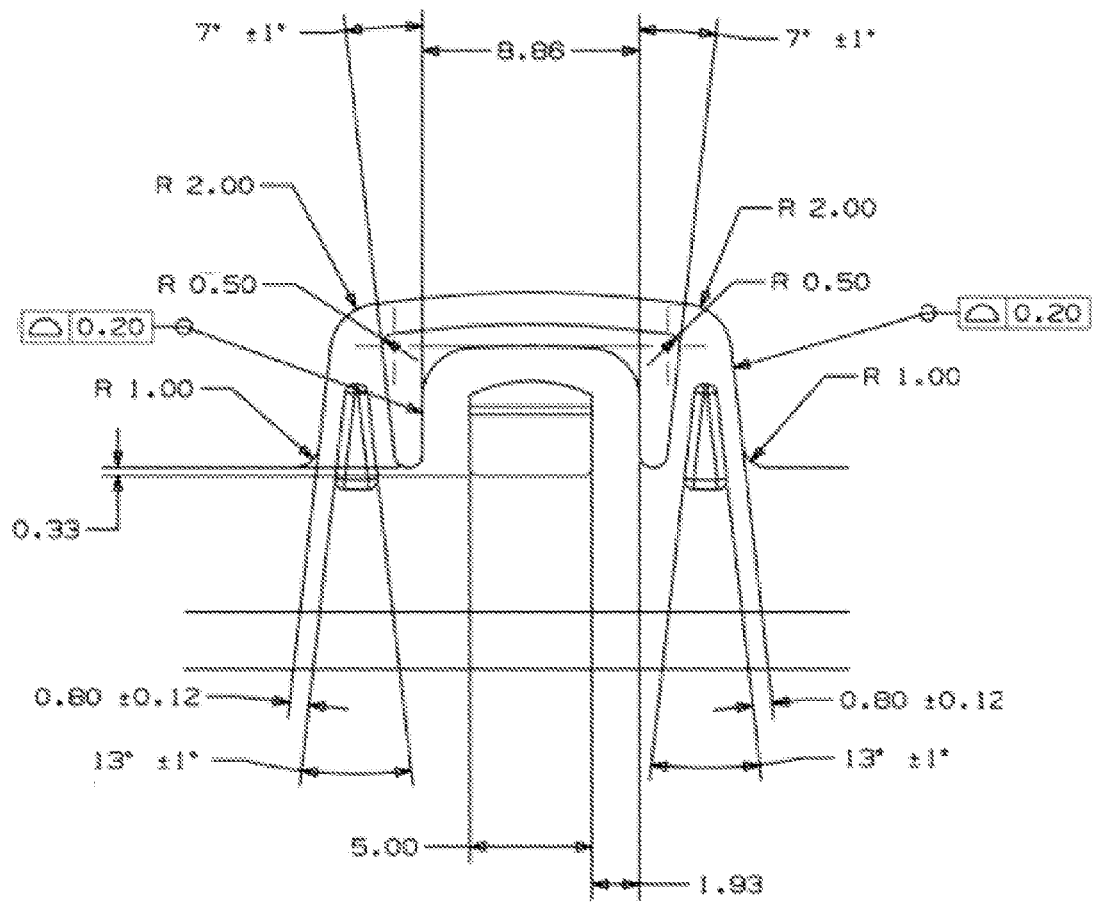

Accordingly, FIGS. 5C and 5D show representative dimensions of attachment feature 400 in accordance with the described embodiments. In particular, FIG. 5C shows a cross section of attachment feature 400 and housing 402 shown in FIG. 5B highlighting specific dimensions for a particular implementation of attachment feature 400. Distance T includes gap distance $d_{gap}$ that must take into consideration the tolerance stack up that directly affects the interference between second housing component 502 and arch portion 408 which, in turn, directly affects locking force $F_{lock}$. Therefore, careful consideration of the tolerance stack is important in order to assure that the yield strength of the material used to form attachment feature 400 is not exceeded. It should be noted as well that a prudent design considers a margin such a range of acceptable engagement can be designed into attachment feature 400. For example, an engagement range of about 0.05 mm to about 0.35 mm can be considered acceptable. Moreover, FIG. 5D shows representative dimensions of attachment feature 400 shown in FIG. 5A.

In the described embodiments, $F_{bias}$ can be calculated as provided by Eq. (1). In this way, the computed stress S in the material that forms attachment feature 400 can be provided by Eq. (2). For example, Tables 1, 2, and 3 show representative values of specific implementation of attachment feature 400 one of which uses aluminum alloy AL 5052 H32 and another using aluminum alloy AL 5052 H36. As can be seen by the results presented in Tables 2 and 3, either material is well suited for applications that rely upon attachment feature 400 for securing at least two components together.

Figure 6:
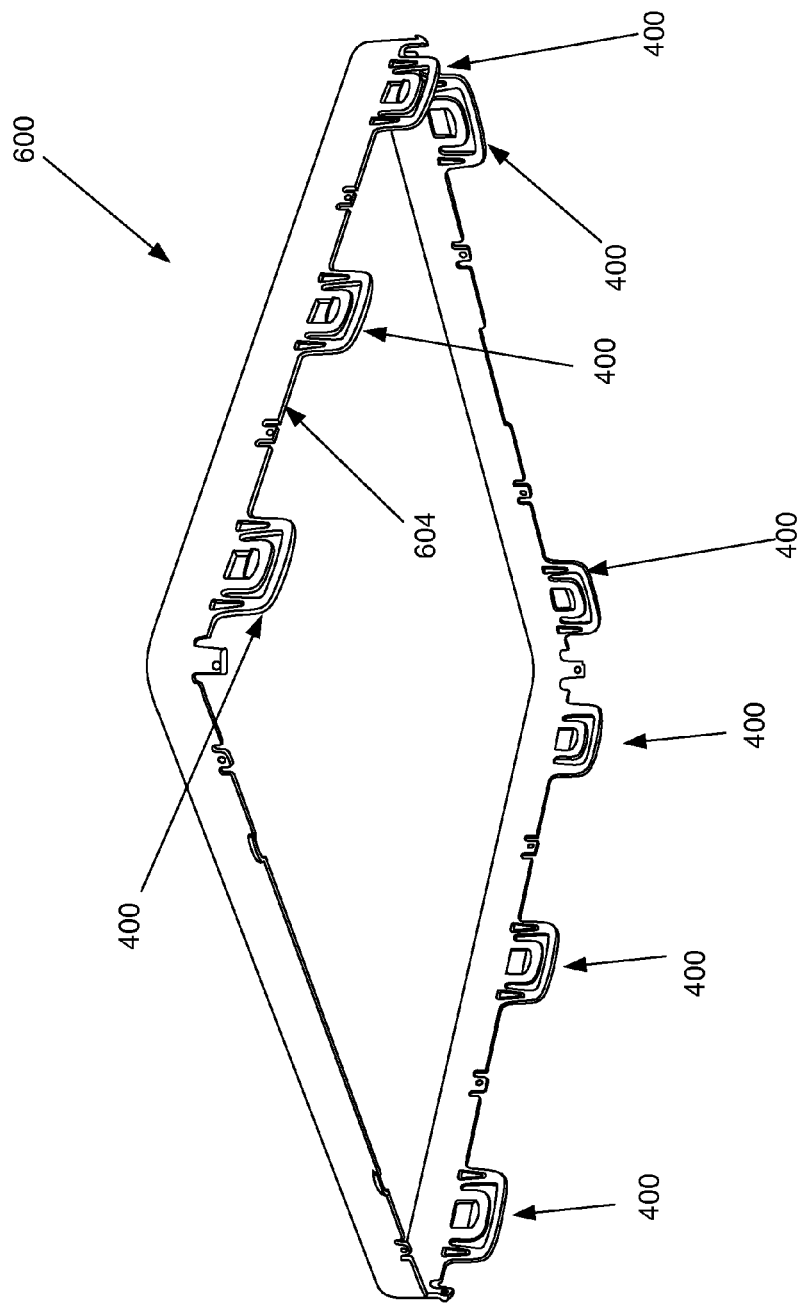
FIG. 6 shows a perspective view of a representative first housing component having a plurality of attachment features in accordance with the described embodiments.

For example, with the embodiment shown in FIG. 6 where eight (8) attachment features can be used, the safety factor (relationship between calculated stress and stress limit) can be shown in Table 3.

$$F = y_{max} \times (4\theta \times E \times I)/L^e \quad \text{Eq(1):}$$

$$S = F/A \quad \text{Eq (2):}$$

L: length of beam
E: modulus of elasticity of material
I: moment of inertia for cross-section (x)
$S_y$: yield strength of material
S: computed stress in material
A: cross-sectional area
b: cross-sectional width (x)
h: cross-sectional height (y)

TABLE 1

| Material | Yield Strength, Sy (MPa) |
|---|---|
| AL 5052 - H32 | 186 |
| AL 5052 - H36 | 234 |

TABLE 2

| F (n) | S (mPa) | deflection (mm) | A | I | b (mm) | h (mm) | L (mm) | E |
|---|---|---|---|---|---|---|---|---|
| 29.27 | 28.02 | 0.1 | 1.04464E−06 | 1.48436E−13 | 0.8 | 1.3058 | 12 | 7.1E10 |
| 87.82 | 84.07 | 0.3 | 1.04464E−06 | 1.48436E−13 | 0.8 | 1.3058 | 12 | 7.1E10 |

TABLE 3

| | Safety Factor: | |
|---|---|---|
| deflection (mm) | H32 | H36 |
| 0.1 | 6.64 | 8.35 |
| 0.3 | 2.21 | 2.78 |

FIG. 6 shows representative first housing component 600 in accordance with the described embodiments. First housing component 600 can be part of a multipart housing used to enclose and support operational components for a portable electronic device. For example, first housing component 600 can be formed of metal such as aluminum or stainless steel and be used as a bottom portion of the portable electronic device. In this way, first housing component 600 can be used to fully enclose and secure operational components used to provide functionality of the portable electronic device. In order to fully enclose the operational components and secure the multipart housing, first housing component 600 can include a plurality of attachment features that can take the form of arch type attachment feature 400 each being located at an edge portion 604 of first housing component 600.

Figure 7:
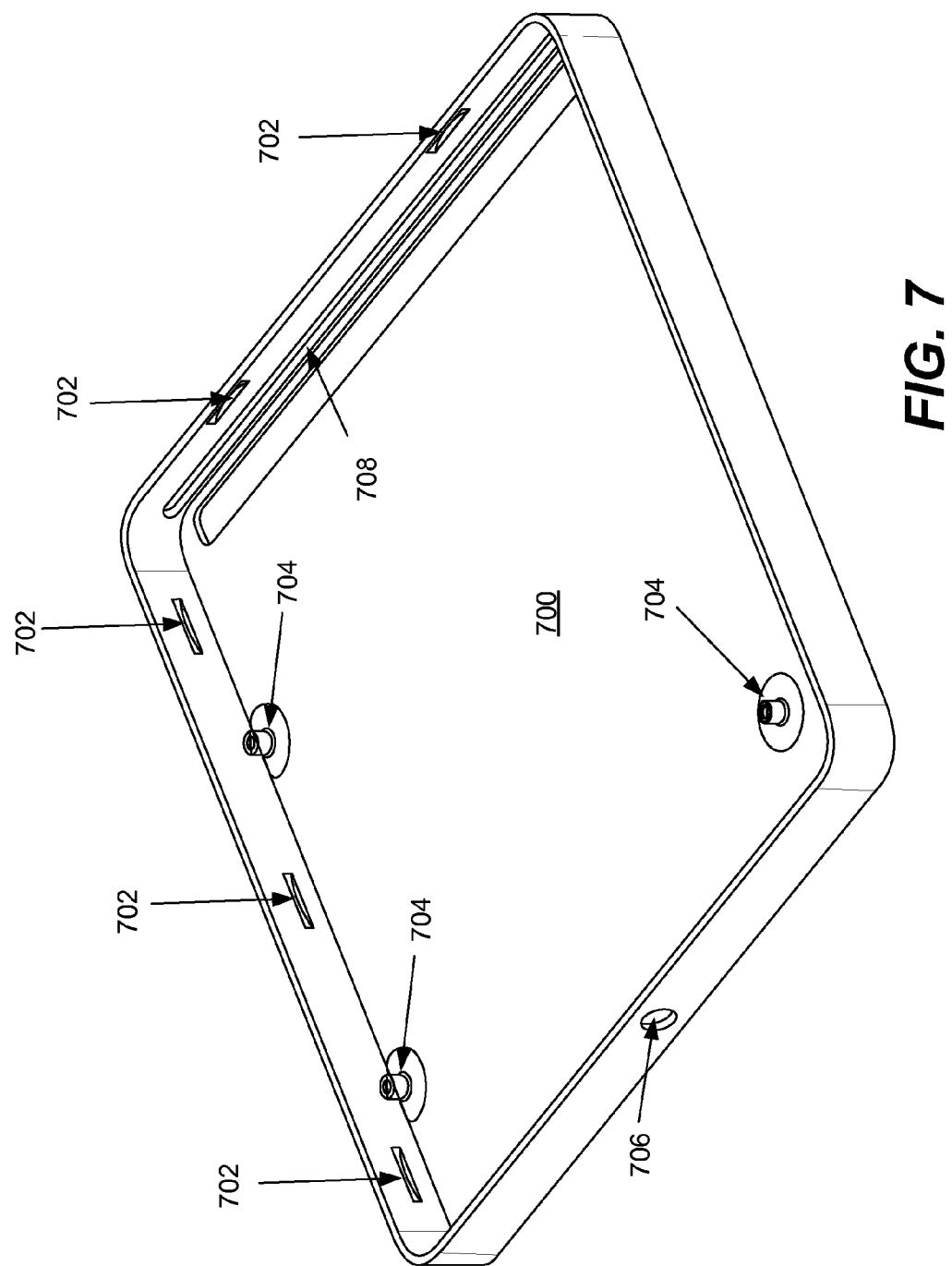
FIG. 7 shows a perspective view of a representative second housing component in accordance with the described embodiments.

FIG. 7 shows representative second housing component 700 in accordance with the described embodiments. Second housing component 700 can be used in conjunction with first housing component 600 to form the multipart housing used to secure and enclose various operational components of the portable electronic device. Second housing component 700 can include a plurality of locking features 702 sized and shaped to accommodate a corresponding one of the plurality of engagement features 420 of attachment feature 400 of first housing component 600. Second housing component 700 can also include mounts 704 on which can be mounted a chassis used to support the plurality of operational components of the portable electronic device. In the particular example, the portable electronic device can include a cable used to communicate with an external circuit such as a computer as well as to accept power from an external power supply. Accordingly, opening 706 can be sized to accommodate the cable and in those cases where the portable electronic device utilizes optical media such as a CD or DVD, slot 708 can accommodate the optical disc.

Figure 8:
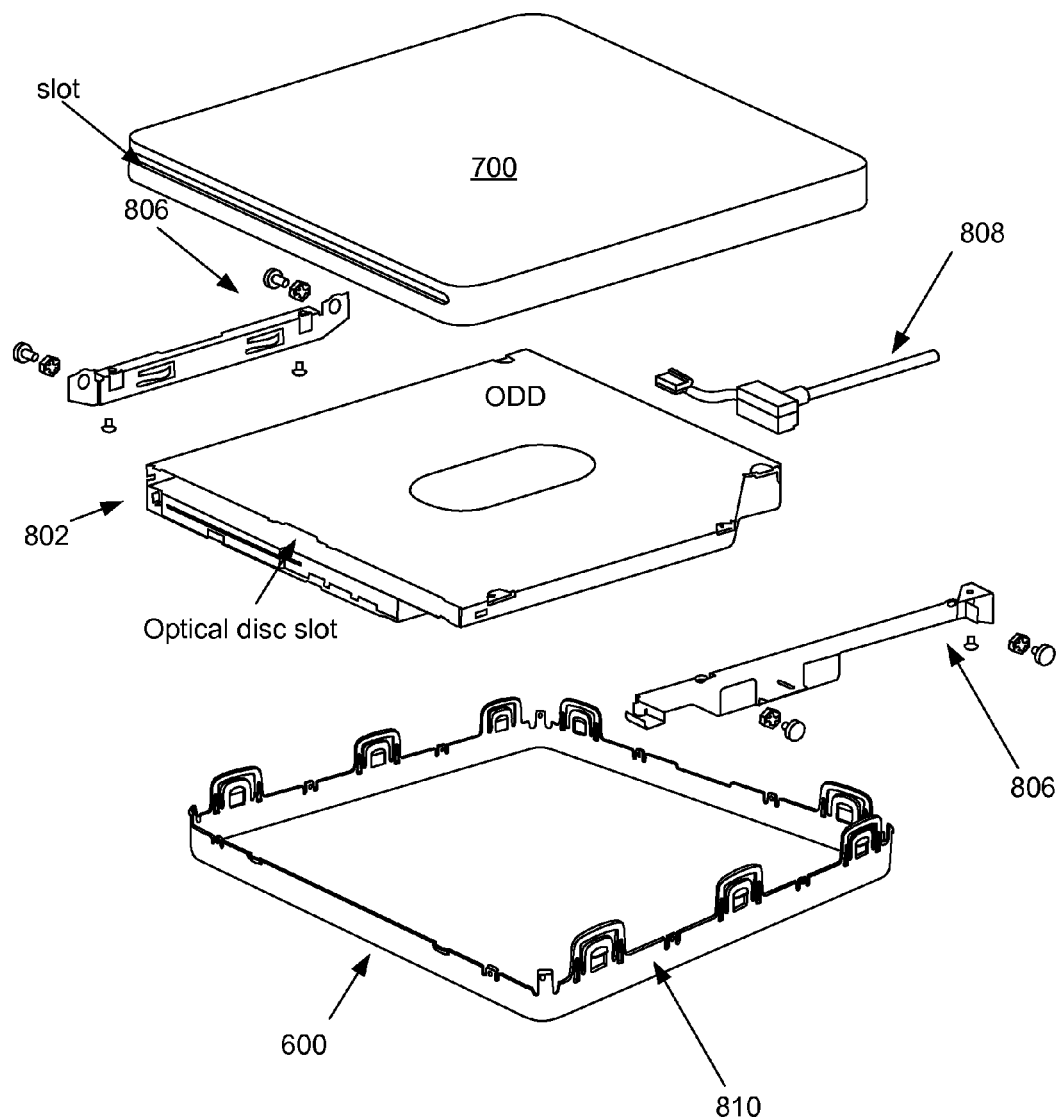
FIG. 8 shows an exploded view of the portable electronic device in the form of a portable disc drive (PDD) having a multipart housing formed of the first and second housing components shown in FIG. 6 and FIG. 7, respectively.

FIG. 8 shows exploded view of a portable electronic device 800 in accordance with the described embodiments. Portable electronic device 800 can take the form of a portable disc drive (PDD) 800 arranged to accept an optical disc along the lines of the CD or DVD. Accordingly, PDD 800 can include operational components 802 that can be enclosed within the multipart housing formed by the attachment of first housing component 600 and second housing component 700 by way of attachment features 400. Accordingly, operational components 802 in the form of chassis 804 can be mounted to second housing component 700 using brackets 806 and supports 704. In order to provide both power and communication with external circuits and power supplies, cable 808 can connected to operational components. Cable 808 can be accommodated by opening 708 in second housing component 700. It should be noted that the placement of attachment features 400 can arranged in such a way to accommodate both the optical disc and cable 808. For example, in order to assure that the size of PDD 800 is about that of the anticipated optical disc, first housing component 600 and second housing component 700 have dimensions about that of the optical disc.

However, in order that second housing component 700 is able to slide over first housing component 600 in order to facilitate the attachment process, second housing component 700 has dimensions slightly larger than those of first housing component 600. In this way, once operational components 802 have been mounted within and secured to second housing component 700, first housing component 600 can be placed in contact with arch 408 of attachment feature 400 and pressed in placed until locking feature 702 engages and secures engagement feature 420.

Figure 9:
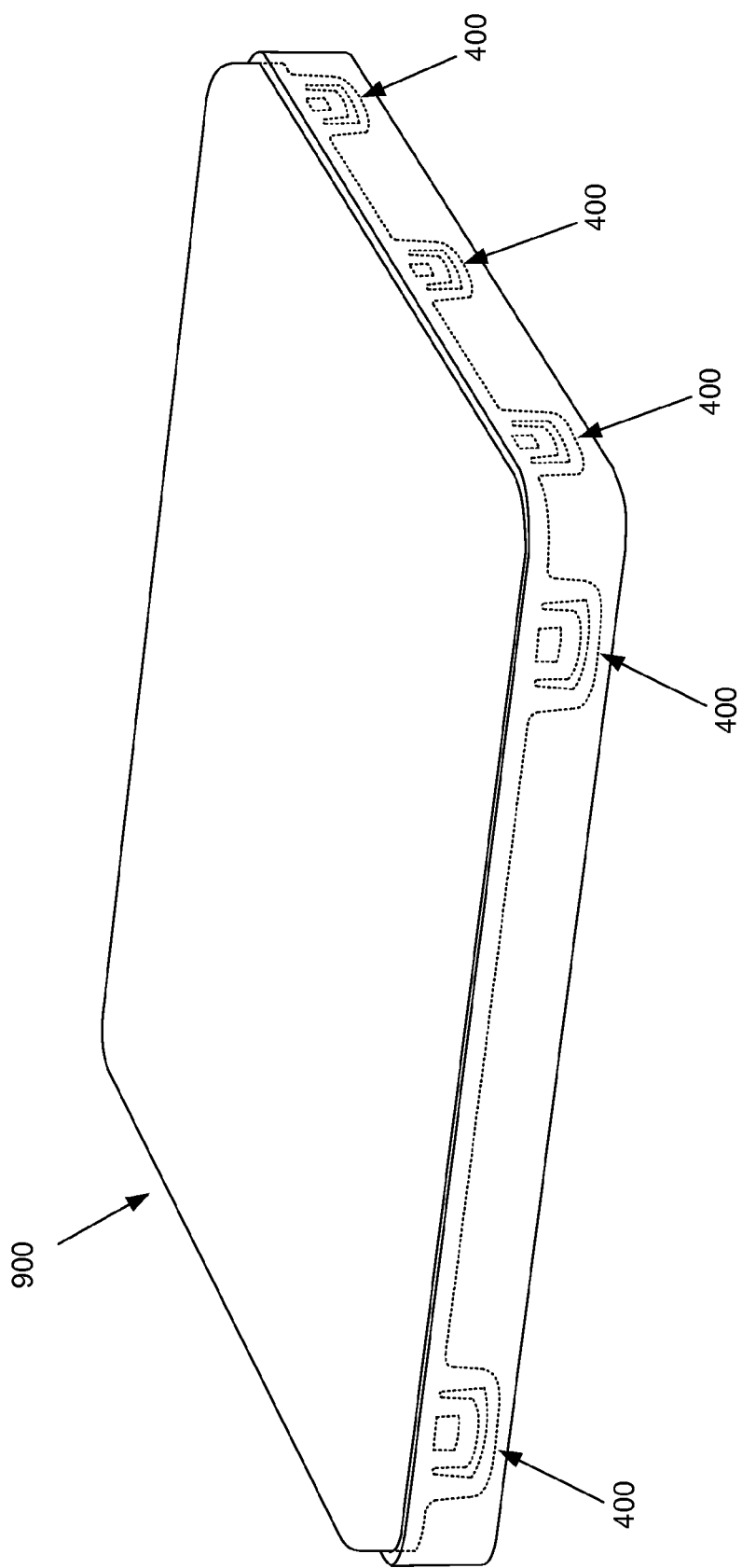
FIG. 9 shows representative fully assembled PDD of FIG. 8.

In particular, outside surface 810 of first housing component 600 can slidingly engage inside surface 812 of second housing component in order to activate second flexure portion 418 until engagement feature 420 is captured by the locking feature in the form of slot 702. In this way, as shown in FIG. 9, multipart housing 900 formed of first housing component 600 secured by way of attachment features 400 to second housing component 700 can be used to form PDD 800.

Figure 10:
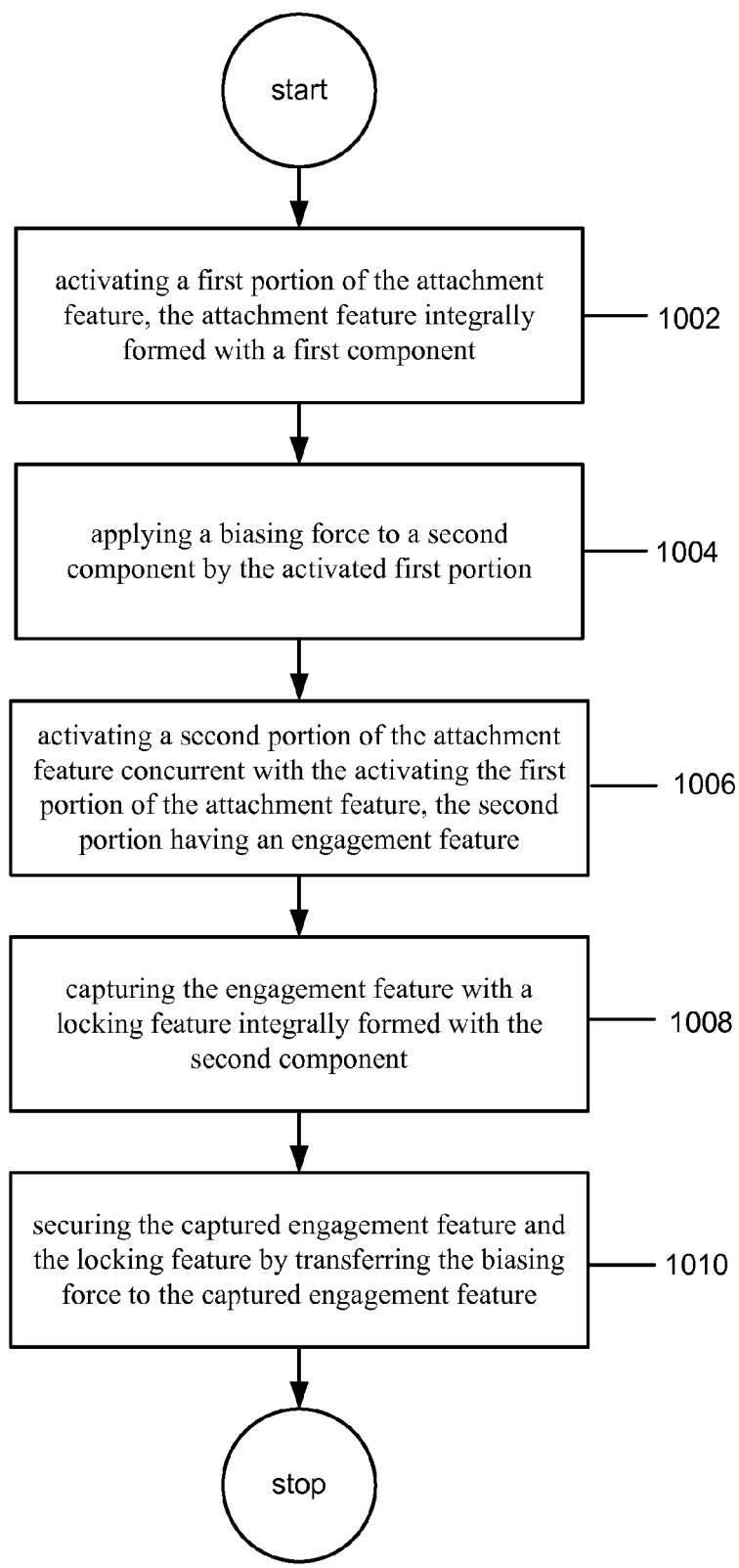
FIG. 10 is a flowchart detailing a process in accordance with the described embodiments.

FIG. 10 shows a flowchart detailing process 1000 in accordance with the described embodiments. Process 1000 can begin at 1002 by activating a first portion of the attachment feature, the attachment feature integrally formed with a first component. At 1004, a biasing force is applied to a second housing component by the activated first portion. At 1006 a second portion of the attachment feature is activated concurrent with the activation of the first portion of the attachment feature. In one embodiment, the first portion of the attachment feature can be activated by a first surface of the second housing component being placed in contact with the first portion of the attachment feature about the same time as a second surface of the second housing component is brought in contact with the second portion of the attachment feature. At 1008, an engagement feature as part of a second portion of the attachment feature can be captured by a locking feature integrally formed on the second housing components. In the described embodiment, the locking feature biases the engagement feature with a locking force having a magnitude that is about the same as the biasing force. In this way, the attachment feature secures the first and second housing components together at 1010.

The advantages of the embodiments described are numerous. Different aspects, embodiments or implementations may yield one or more of the following advantages. Many features and advantages of the present embodiments are apparent from the written description and, thus, it is intended by the appended claims to cover all such features and advantages of the invention. Further, since numerous modifications and changes will readily occur to those skilled in the art, the embodiments should not be limited to the exact construction and operation as illustrated and described. Hence, all suitable modifications and equivalents may be resorted to as falling within the scope of the invention.

What is claimed is:

1. An attachment mechanism for attaching a first component and a second component, comprising
    a first flexure portion integrally formed with the first component, the first flexure portion further comprising
        a deflectable arch portion capable of deflecting in a first direction, and
        a load bearing first and second column having a first end integrally formed with the deflectable arch portion and a second end integrally formed with the first component, the first and second columns acting as a stop mechanism that limits the amount of deflection of the arch portion in the first direction to no more than a first maximum amount of deflection;
    a second flexure portion spaced apart from the first portion and deflectable in at least a second direction substantially orthogonal to the first direction, wherein the second flexure portion includes an engagement feature; and
    a locking feature included in the second component, wherein the locking feature secures the second component to the first component by engaging the engagement feature with a securing force proportional to an amount of deflection of the first flexure portion, and wherein the first flexure portion and the second flexure portion remain apart.

2. The attachment mechanism as recited in claim 1, wherein the load bearing first and second columns transfer a first load applied by the second component onto the attachment mechanism directly to the first component only when the amount of deflection is at least the first maximum deflection.

3. The attachment mechanism as recited in claim 2, wherein the deflecting of the arch portion in the first direction is caused by the first load applied by the second component onto the arch portion, wherein the deflected arch portion responds to the applied load by biasing the second component with the securing force, the securing force proportional to the amount of deflection of the arch portion and in a direction counter to that of the applied load.

4. The attachment mechanism as recited in claim 3, wherein concurrent with the second component applying the first load to the arch portion, the second component applies a second load to the second portion, the second portion responding to the second load by deflecting in at least the second direction to at most a second maximum amount until an engagement feature integrally formed in the second component is encountered.

5. The attachment feature as recite in claim 4, wherein when the second portion encounters the engagement feature, the second portion engages the engagement feature with the securing force.

6. A method of securing together a first housing component and a second housing component using an attachment feature integrally formed with the first housing component, the attachment feature having a first flexure portion and a second flexure portion that remain separate from each other and move independent of each other, the second flexure portion having an engagement feature, comprising:
    applying a biasing force to the first housing component by the first flexure portion, the biasing force being proportional to an amount of deflection of the first flexure portion;
    capturing the engagement feature with a locking feature integrally formed on the second housing component; and
    securing the captured engagement feature with a securing force, the securing force being directly related to the biasing force.

7. The method as recited in claim 6, wherein the attachment feature is an arch type attachment feature, wherein the first portion comprises;
    a arch portion, and
    a first and second column portion each supporting the arch portion at a first end and a second end, respectively, wherein the first and second column portions act as stop mechanisms that prevent the arch portion from exceeding a maximum deflection.

8. The method as recited in claim 7, wherein when the arch portion has a curvature that is a critical curvature, then an excess load applied to the arch type attachment feature is transferred by way of the first and second column portions to the first housing component.

9. The method as recited in claim 8, wherein the first portion of the arch type attachment feature is activated by placement of the second housing component in contact with the arch portion of the first portion of the attachment feature, applying an external force to the arch portion by the second housing component, and providing a counter force in the form of a biasing force that is proportional to an amount of deflection of the arch portion.

10. The method as recited in claim 9, wherein the biasing of the engagement between the engagement feature and the locking feature is directly proportional to the biasing force.

11. A portable electronic device, comprising:
    a plurality of operational components; and
    a multipart housing arranged to enclose and secure at least some of the plurality of operational components, the multipart housing comprising: a first and second housing component, the first housing component having a first attachment feature integrally formed therewith, the first attachment feature having a first flexure portion arranged to provide a biasing force when activated by contact with the second housing component and a second flexure portion having an engagement feature,
    a second housing component, the second housing component having a locking feature, the locking feature having a size and shape in accordance the engagement feature, such that the first attachment feature securely attaches the first and second housing components together by the locking feature capturing the engagement feature with a locking force having a magnitude about that of the biasing force.

12. The portable electronic device as recited in claim 11, wherein the first attachment feature comprises:
a body integrally formed with the first housing component, and wherein the first flexure portion and the second flexure portion are each spaced apart from each other, the first flexure portion deflectable in at least a first direction and the second flexure portion deflectable in at least a second direction substantially orthogonal to the first direction, wherein the second flexure portion secures the second housing component to the first housing component, wherein the locking force is proportional to an amount of deflection of the first flexure portion.

13. The portable electronic device as recited in claim 11, wherein the first flexure portion comprises:
a deflectable arch portion; and
a load bearing first and second column having a first end integrally formed with the deflectable arch portion and a second end integrally formed with the first housing component, the first and second columns acting as a stop mechanism that limits the amount of deflection of the arch portion in the first direction to no more than a first maximum amount of deflection, the load bearing first and second columns transferring a first load applied by the second component onto the attachment feature directly to the first housing component only when the amount of deflection is at least the first maximum deflection.

14. The portable electronic device as recited in claim 13, wherein the deflecting of the arch portion in the first direction is caused by the first load applied by the second housing component onto the arch portion, wherein the deflected arch portion responds to the applied load by biasing the second housing component with the biasing force, the biasing force proportional to the amount of deflection of the arch portion and in a direction counter to that of the applied load.

15. The portable electronic device as recited in claim 14, wherein concurrent with the second housing component applying the first load to the arch portion, the second housing component applies a second load to the second flexure portion, the second flexure portion responding to the second load by deflecting until a locking feature integrally formed in the second component captures the engagement feature.

16. A method of assembling a portable electronic device having a multipart housing, comprising:
providing a first and second housing component of the multipart housing, the first housing component having an attachment feature integrally formed on an edge portion of the first housing component, the attachment feature comprising a first flexure portion and a second flexure portion, the second flexure portion having an engagement feature;
providing a plurality of operational components;
securing at least some of the plurality of operational components into the second housing component;
aligning the attachment feature with a locking feature integrally formed on a first surface of the second housing component such that the locking feature aligns with the engagement feature;
placing the first housing component in contact with the second housing component by placing the first flexure portion in contact with an inside surface of a second surface of the second housing component concurrently with the second flexure portion in sliding contact with an inside surface of the first surface of the second housing component; and
moving the first housing component in relation to the second housing component until the locking feature captures the engagement feature with a locking force.

17. The method as recited in claim 16, wherein the moving of the first housing component in relation to the second housing component causes the first flexure portion to undergo a deflection of a deflection amount, the method further comprising:
generating a bias force in proportion to the deflection amount;
applying the bias force to the second housing component; and
transferring the bias force by way of the second housing component to the locking feature.

18. The method as recited in claim 17, wherein the locking force is substantially equal to the bias force.

19. The method as recited in claim 16, wherein the attachment feature further comprises:
an arch portion; and
a first and second column portions connecting the arch portion to the edge portion of the first housing component.

20. The method as recited in claim 19, wherein the deflection of the arch portion represents substantially all of the deflection of the first flexure portion, the arch portion having a maximum deflection amount.

21. The method as recited in claim 20, wherein any portion of the applied external force that would otherwise cause the arch portion to deflect beyond the maximum deflection amount is passed directly to the edge portion of the first housing component.

* * * * *